Sept. 7, 1954  E. A. WALLER  2,688,350
SECTIONAL ROTATABLE LOG BARKING DRUM
Filed Jan. 22, 1951  2 Sheets-Sheet 2
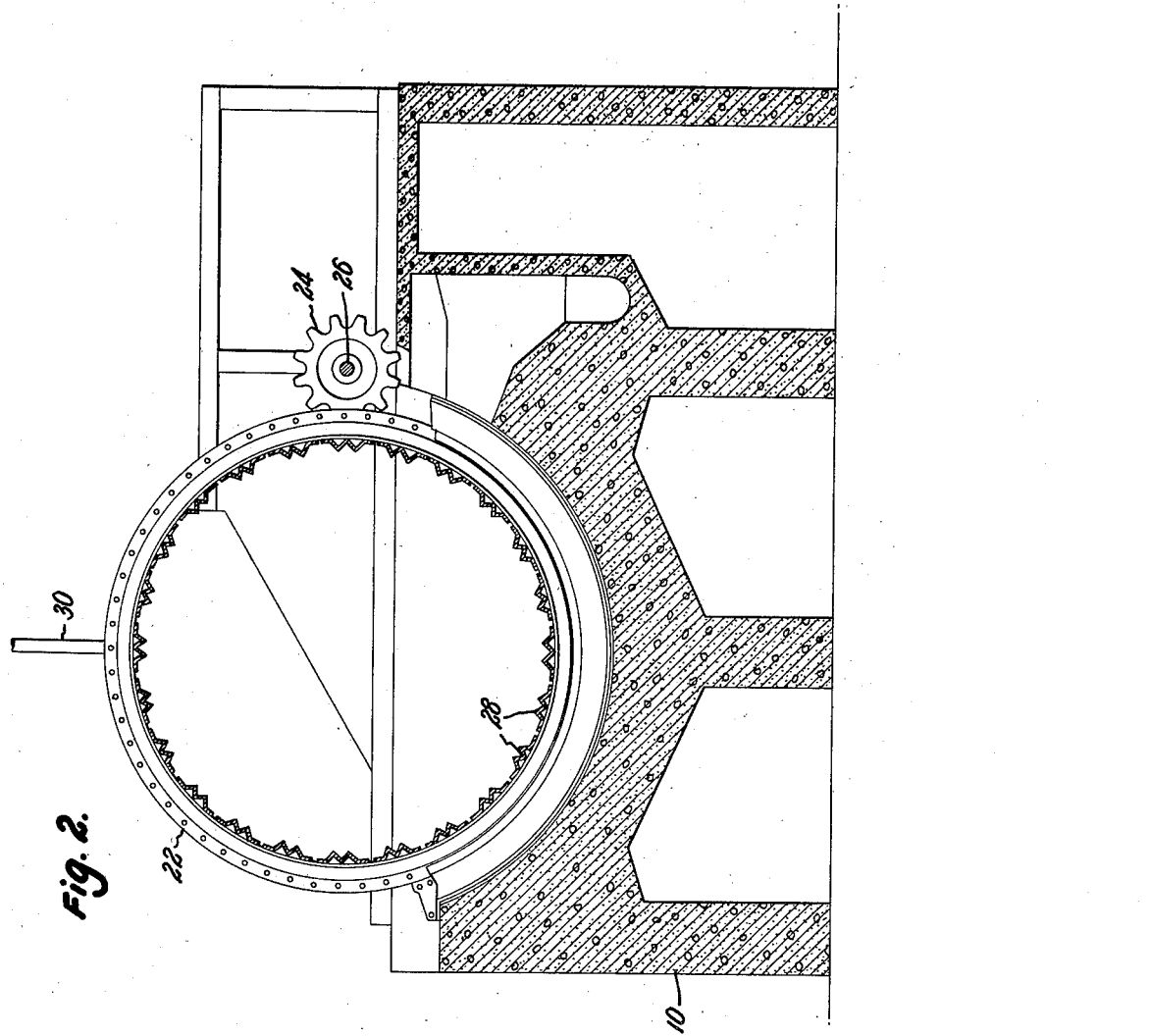
INVENTOR
Erik Arne Waller
BY Pierce, Scheffler & Parker
ATTORNEYS

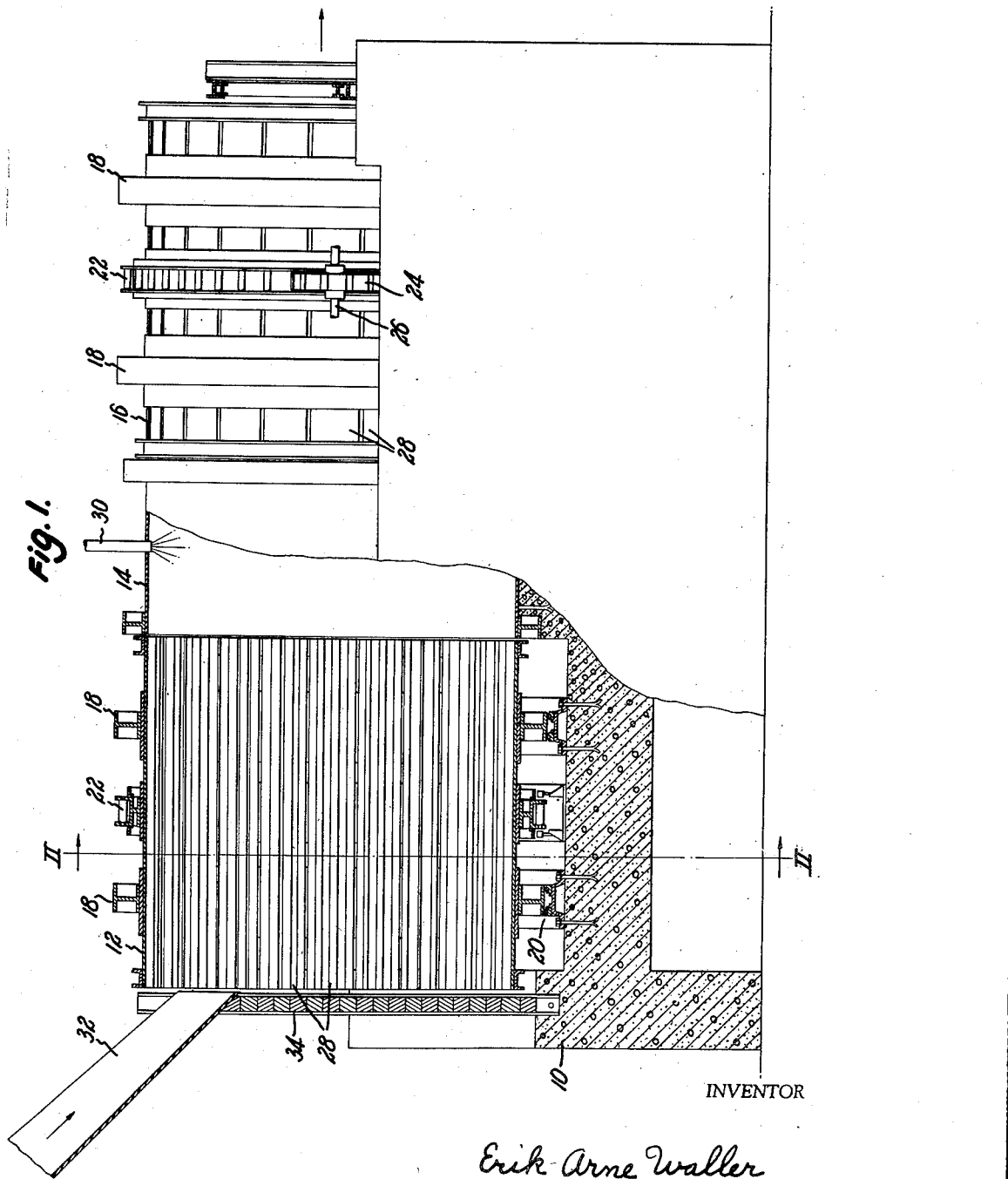

Patented Sept. 7, 1954

2,688,350

UNITED STATES PATENT OFFICE 2,688,350

SECTIONAL ROTATABLE LOG BARKING DRUM

Erik Arne Waller, Skoghall, Sweden

Application January 22, 1951, Serial No. 207,126

Claims priority, application Sweden January 21, 1950

3 Claims. (Cl. 144—208)

For barking logs to be used for instance in the manufacture of cellulose pulp rotating drums are widely used, in which the logs are charged through one end and discharged through the opposite end. Owing to the friction between the logs as well as between the individual logs and the wall of the drum caused by the rotation of the drum the bark is rubbed off from the logs. The barking efficiency of the drum is, of course, generally speaking proportional to the friction work thereby developed.

Barking drums are of very large dimensions in relation to the useful work delivered by them. The total power consumption for a barking drum of 5 m. diameter and 12 m. length containing wet logs of 2 m. length is only about 70 H. P. including the idling loss of the drum and associated machinery. This is due to the fact that the movement in the mass of logs and between said mass and the wall of the drum is relatively slight since the logs during a considerable part of the treatment period are stationary in relation to the drum and to adjacent logs. The barking drums therefore occupy a large space and are very expensive.

The main object of the present invention is to bring about a more intensive movement between the wall of the drum and the logs as well as between the individual logs, thereby considerably increasing the useful friction and, thus, the barking efficiency with unaltered or diminished dimensions of the drum.

In order to attain this object and other advantages which will be evident from the following description, the drum is divided into a plurality of relatively short sections and said sections are rotated in such a manner that there is always a relative rotating movement between two adjacent sections. For this purpose adjacent drum sections can be rotated at different speeds and/or in opposite directions or according to a preferred embodiment the drum is divided into alternately rotating and stationary ring sections, the stationary sections preferably being shorter than the rotating sections.

The invention is now to be described more in detail with reference to the accompanying drawing illustrating an embodiment of a barking drum divided into alternately stationary and rotating drum sections.

On the drawing

Fig. 1 is a side view partially in section and

Fig. 2 is a section on line II—II of Fig. 1.

Reference numeral 10 designates a mounting or bed of concrete, preferably reinforced for the drum sections 12, 14 and 16 of which 12 and 16 are rotatable whereas 14 is stationary. The rotatable drum sections 12 and 16 are supported by means of circular flanges 18 resting on fluid under pressure in ring shaped grooves 20 in a manner known per se. Rotating drum sections 12 and 16 are provided with gear rings 22 meshing with gears 24 on driving shaft 26.

The interior surfaces of the different drum sections can be smooth but preferably at least the rotatable sections are interiorly provided with bark cutters 28 or the like serving also to move the logs.

As is well known it is advantageous to spray water on to the logs during the barking and this measure is easily carried out according to the invention by inserting water pipes or nozzles 30 through the wall of the stationary drum section 14.

At the entrance end of the drum there is provided a feeding chute 32 through which the logs are introduced into the first rotating drum section 12. Otherwise this end of the drum is covered by a wall 34, which prevents the logs from falling out of the drum at this end.

When barking logs of about 2 m. length to be used for the production of wood pulp, e. g. a drum of about 4.2 m. in diameter can be used. The first drum section 12 which is rotated has a length of about 4 m. and is provided with bark cutters. After passing this first section 12 the logs arrive in the stationary section 14 which is of about 1.5 m. length and has a smoth inner surface, and are finally passed through the last rotating section 16 of the same length as the first rotating section 12 before they are discharged.

The barking machinery according to the above example has considerably higher barking effect than the rotating drums in which the logs are tumbled in the hitherto usual manner. This is due to the fact that according to the invention the stationary section 14 causes a retardation of the rotary movement of the logs within the stationary section, whereby an effective relative movement is created within the charge of logs as they pass between a stationary and a rotating section. The power consumption is considerably higher which is advantageous since it is a measure of the barking effect.

The invention is, of course, not limited to the above described and illustrated embodiment but may be varied in many respects within the scope of the annexed claims.

Thus, the number of sections can be more than three and the sections can be alternately rotating and stationary. As a rule, at least the first and preferably also the last section is rotatable.

I claim:

1. A drum for barking wood logs comprising at least three independent drum sections arranged axially end to end in which at least one intermediate section remains stationary during the barking operation.

2. A drum as claimed in claim 1 in which the stationary section is of shorter length than the logs to be barked.

3. A drum as claimed in claim 1 in which the stationary section is provided with means for spraying water on to the logs being barked.

References Cited in the file of this patent

UNITED STATES PATENTS

| Number | Name | Date |
|---|---|---|
| 548,115 | Davidsen | Oct. 15, 1895 |
| 1,120,636 | Whitcomb | Dec. 8, 1914 |
| 1,194,872 | Paulson | Aug. 15, 1916 |
| 1,904,937 | Strindlund | Apr. 18, 1933 |
| 2,140,287 | Guettler | Dec. 13, 1938 |
| 2,428,967 | Gray | Oct. 14, 1947 |

FOREIGN PATENTS

| Number | Country | Date |
|---|---|---|
| 52,015 | Norway | Jan. 16, 1933 |